United States Patent [19]

Hayashi

[11] Patent Number: 5,587,992

[45] Date of Patent: Dec. 24, 1996

[54] SAMPLED-SERVO TYPE OPTICAL DISK HAVING CLOCK PITS ARRANGED OFFSET FROM EACH OTHER IN THE DISK RADIAL DIRECTION

[75] Inventor: Hideki Hayashi, Tsurugashima, Japan

[73] Assignee: Pioneer Electronic Corporation, Tokyo, Japan

[21] Appl. No.: 343,947

[22] Filed: Nov. 17, 1994

[30] Foreign Application Priority Data

Nov. 19, 1993 [JP] Japan ................................. 5-290959

[51] Int. Cl.$^6$ ........................................................ G11B 7/00
[52] U.S. Cl. ........................... 369/275.4; 369/275.3; 369/58; 369/52
[58] Field of Search ........................... 369/275.1, 275.2, 369/275.3, 275.4, 276, 58, 54, 52, 44.34, 44.26

[56] References Cited

U.S. PATENT DOCUMENTS

5,172,352  12/1992  Kobayashi ........................... 369/44.26
5,214,629   5/1993  Watanabe et al. .................... 369/44.26

*Primary Examiner*—Viet Q. Nguyen
*Assistant Examiner*—Andrew Q. Tran
*Attorney, Agent, or Firm*—Sughrue, Mion, Zinn, Macpeak & Seas

[57] ABSTRACT

An optical disk is formed by arranging synchronization pits present on each track of the optical disk to align with each other in the radial direction of the disk. Further, the clock pits which are present on the tracks of the optical disk are arranged to deviate from each other in a reading direction of the disk per adjacent track in the radial direction of the disk. An apparatus for reproducing the recorded information compares the size of each value of read-out signal obtained at the respective estimated detection timing of the clock pits for detecting phase, and corrects the phase of the reproducing clock on the read-out signal obtained by the estimated detection timing corresponding to the result of such comparison. With the structure as described above, the phase of the reproducing clock can be corrected without being affected by cross talks from the adjacent tracks.

4 Claims, 8 Drawing Sheets

| | |
|---|---|
| $T_1$ | ESTIMATED DETECTION TIMING FOR WOBBLE PIT $P_{W1}$ |
| $T_2$ | ESTIMATED DETECTION TIMING FOR WOBBLE PIT $P_{W2}$ |
| $T_3$ | ESTIMATED DETECTION TIMING IN THE LEVEL ASCENDING POSITION OF THE READ-OUT SIGNAL IN THE CLOCK PIT $P_{C1}$ |
| $T_4$ | ESTIMATED DETECTION TIMING IN THE PEAK POSITION OF THE READ-OUT SIGNAL IN THE CLOCK PIT $P_{C1}$ |
| $T_5$ | ESTIMATED DETECTION TIMING IN THE LEVEL DESCENDING POSITION OF THE READ-OUT SIGNAL IN THE CLOCK PIT $P_{C1}$ |
| $T_6$ | ESTIMATED DETECTION TIMING IN THE LEVEL ASCENDING POSITION OF THE READ-OUT SIGNAL IN THE CLOCK PIT $P_{C2}$ |
| $T_7$ | ESTIMATED DETECTION TIMING IN THE PEAK POSITION OF THE READ-OUT SIGNAL IN THE CLOCK PIT $P_{C2}$ |
| $T_8$ | ESTIMATED DETECTION TIMING IN THE LEVEL DESCENDING POSITION OF THE READ-OUT SIGNAL IN THE CLOCK PIT $P_{C2}$ |

SAMPLED-SERVO TYPE OPTICAL DISK HAVING CLOCK PITS ARRANGED OFFSET FROM EACH OTHER IN THE DISK RADIAL DIRECTION

BACKGROUND OF THE INVENTION

1. Field of the Invention

This invention relates to a sampled servo type optical disk and an apparatus for reproducing the recorded information.

2. Description of the Related Background Art

As a format for an optical disk serving as an optical recording medium, there is known a sampled servo type in which the servo area and data area are cyclically and alternately arranged in the reading direction of information. Also, for a sampled servo optical disk of the kind, there is known a narrow track type which makes it possible to perform a double density recording by narrowing each pitch of the recording tracks.

Figure 1:
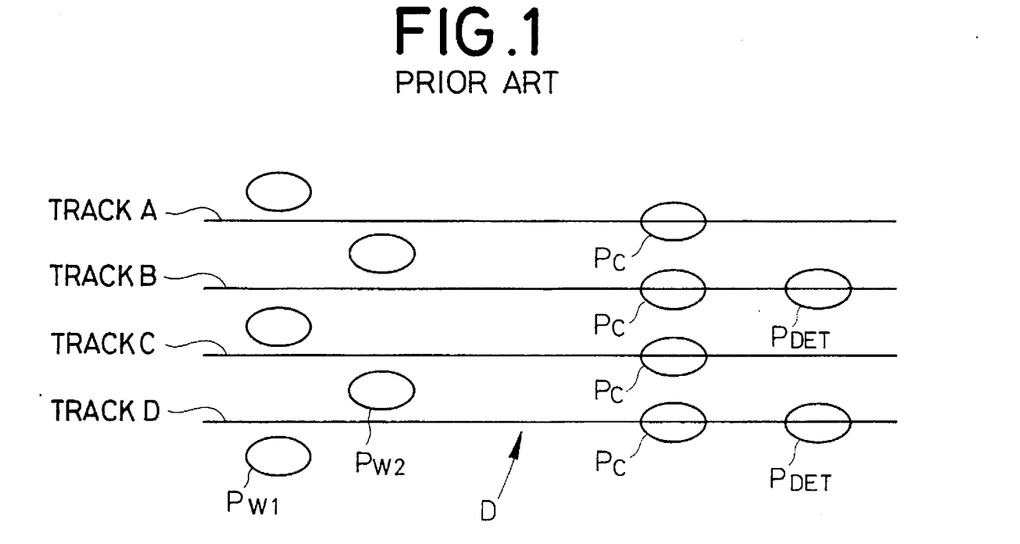
FIG. 1 is a view showing the structure of the servo area of an optical disk.

FIG. 1 is a view showing the known structure of the servo area in an optical disk of such a sampled servo type.

As shown in FIG. 1, the servo area of such optical disk comprises wobble pits $P_{W1}$ and $P_{W2}$ for tracking servo; a mirror section D for synchronization detection and focusing servo; clock pits $P_C$ for reproducing clock phase detection; and track identifying pits $P_{DET}$ for identifying the track positions (even-numbered track or odd-numbered track). Each of these wobble pits $P_{W1}$ and $P_{W2}$, mirror section D, clock pits $P_C$, and track identifying pits $P_{DET}$ is aligned and formed in the radial direction of the disk.

However, if there is a rotational fluctuation in the rotational speed of the spindle motor of a recording apparatus for the master disk which records each of the pits in the servo area, each of the clock pits $P_C$ to be formed on the respective tracks is affected by such a rotational fluctuation, and is eventually recorded in a position slightly displaced from the ideal recording position. For example, as shown in FIG. 2, the positions of the center points of the clock pits $P_C$ formed respectively on the tracks B and D adjacent to the track C are displaced by $\Delta t_2$ and $\Delta t_1$ with respect to the position of the center point t of the clock pit $P_C$ on the track C.

Figure 2:
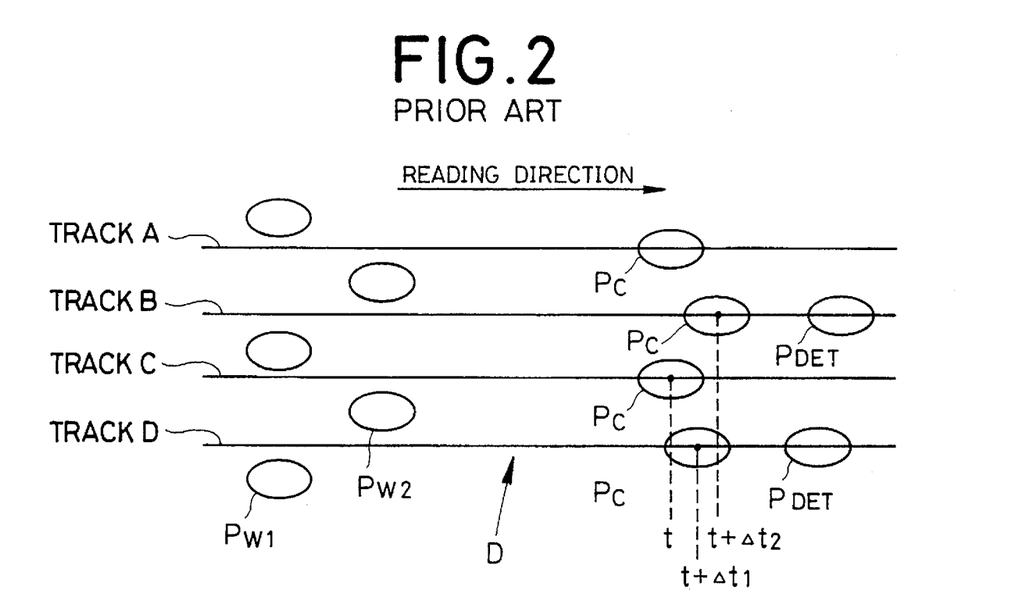
FIG. 2 is a view showing the structure of the servo area of an optical disk formed by an apparatus for recording a master disk having the rotational fluctuation of the rotational speed of a motor.
Figure 3:
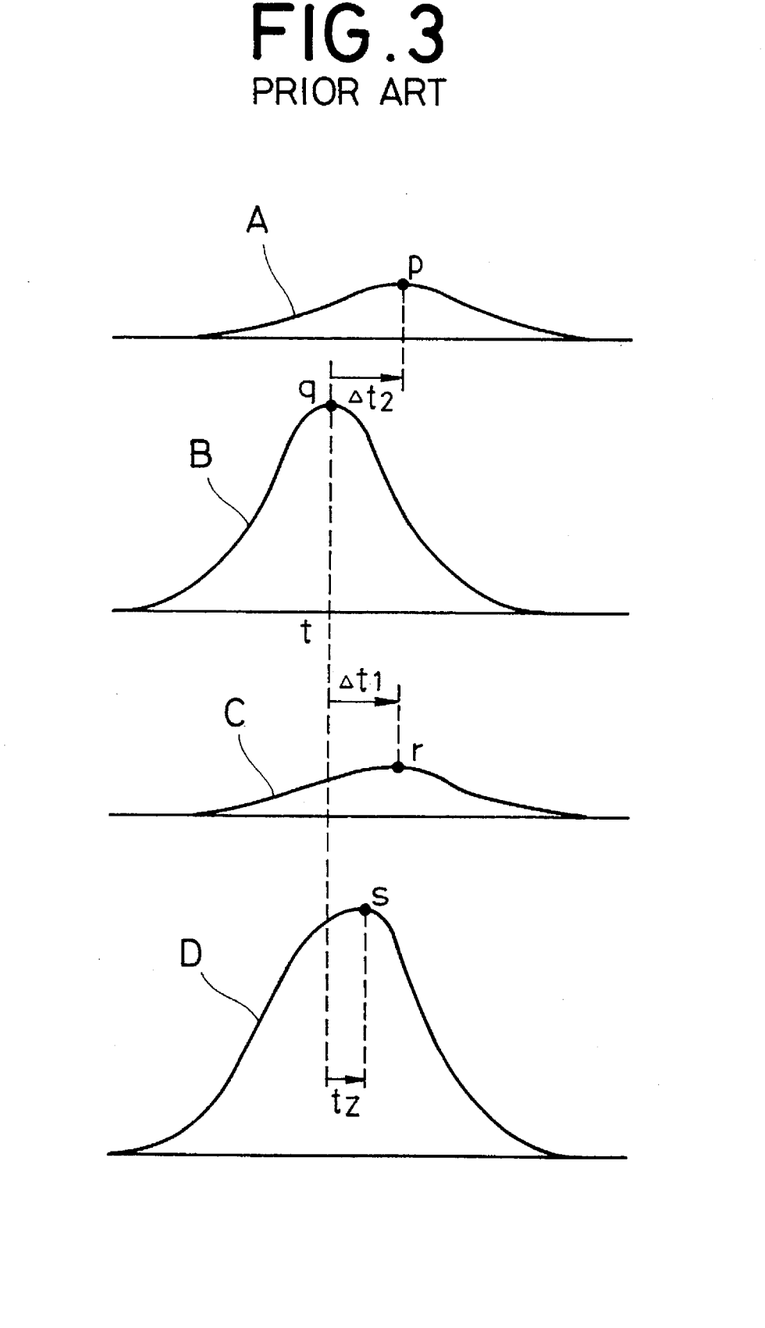
FIG. 3 is a view showing the waveforms of clock pit reading signal affected by the cross talks from the adjacent tracks.

Here, if it is assumed that there are no cross talks at all from the adjacent tracks when the information is read, a waveform of a read-out signal obtainable from the clock pit on the track B in FIG. 2 presents the waveform A shown in FIG. 3. In such a waveform A, its peak value p is at the position of center point $t + \Delta t_2$ of the clock pit. Also, a waveform of a read-out signal obtainable from the clock pit on the track C in FIG. 2 presents the waveform B shown in FIG. 3. In such a waveform B, its peak value q is at the position of center point t of the clock pit. Also, a waveform of a read-out signal obtainable from the clock pit on the track D in FIG. 2 presents the waveform C shown in FIG. 3. In such a waveform C, its peak value r is at the position of center point $t + \Delta t_1$ of the clock pit.

However, in the narrow track type, there tends to be the influence of cross talks from the adjacent tracks to the extend that the track pitch is narrowed. In other words, the read-out signal obtainable when the clock pit formed on the track C is read is affected by the cross talks from the clock pits formed on the tracks B and D. In this case, a waveform of a read-out signal obtained when the clock pit on the track C is read presents a waveform D produced by synthesizing the waveform A, waveform B, and waveform C shown in FIG. 3. The waveform of the read-out signal obtained from the clock pit recorded on the track C should inevitably be time shifted by $t_z$ as compared with a case where no cross talk is present at all.

Therefore, in the reproducing clock whose phase is corrected on the basis of the read-out signal obtained from the clock pit which has been time shifted, jitters are inevitably generated, thus causing a problem that the recorded information cannot be reproduced in a good precision.

SUMMARY OF THE INVENTION

This invention has been accomplished to solve such problem. It is an object of the invention to provide an optical disk capable of reproducing the recorded information in a good precision without generating jitters in the reproducing clocks even when the servo area of the optical disk is formed by an apparatus for recording a master disk having the rotational fluctuation of the rotational speed of the spindle motor, and also, to provide an apparatus for reproducing the recorded information.

An optical disk according to this invention is of a sampled servo type in which the servo area and data area are aligned in the radial direction of the disk, and each of the clock pits for phase detection formed on each track in the servo area is arranged to deviate from each other in the radial direction of the disk per adjacent track.

Also, the apparatus for reproducing the recorded information according to this invention is provided for reproducing the recorded information from an optical disk in which the servo area and data area are formed by arranging each of the clock pits for phase detection to deviate from each other per adjacent track in the radial direction of the disk, and this apparatus comprises means for reading the recorded information which is recorded on the optical disk as pits, and obtaining a read-out signal in accordance with such reading; phase error signal generating means for comparing the size of each value of said read-out signal obtained by the respective timing of said estimated detection timing, and generating a phase error signal in accordance with the maximum value of the read-out signal obtained at the estimated detection timing; and means for correcting phases to execute the phase correction of the reproducing clock on the basis of such phase error signal.

DETAILED DESCRIPTION OF THE PREFERRED EMBODIMENTS

Hereinafter, the description will be made of the embodiments according to this invention.

Figure 4:
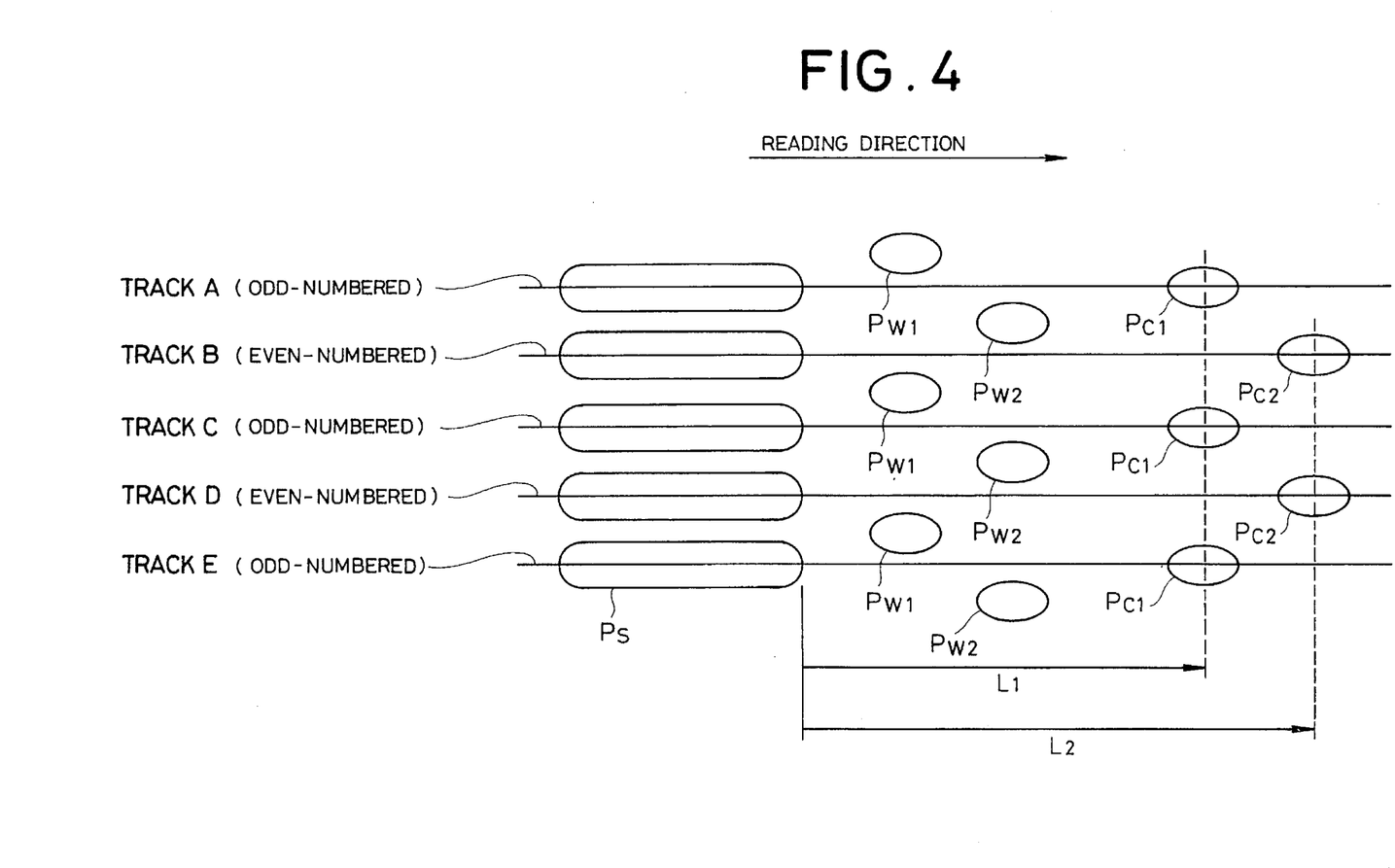
FIG. 4 is a view showing the structure of the servo area of an optical disk according to this invention.

FIG. 4 is a view showing the structure of the servo area of an optical disk according to this invention.

As shown in FIG. 4, in a servo area of the kind, there are arranged synchronous pits $P_S$ for synchronization detection; wobble pits $P_{W1}$ and $P_{W2}$ for tracking servo; and clock pits $P_{C1}$ and $P_{C2}$ for detecting the reproducing clock phase. The synchronous pit $P_S$ is a pit having a pit length which does not appear in the data area, for example. The clock pit $P_{C1}$ is formed in a position apart from the synchronous pit $P_S$ by $L_1$ and aligned only in the odd-numbered tracks in the radial direction of the disk. On the other hand, the clock pit $P_{C2}$ is formed in a position apart from the synchronous pit $P_S$ by $L_2$ and aligned only in the even-numbered tracks in the radial direction of the disk. The distances for these clock pits $P_{C1}$ and $P_{C2}$ in the reading direction, that is, the $L_2-L_1$ in FIG. 4, are approximately such distances in which these pits are not affected by any cross talks each other from the adjacent tracks even when there are rotational fluctuations of the rotational speed of the spindle motor of an apparatus for recording a master disk. In other words, each of the adjacent tracks to the clock pits $P_{C1}$ and $P_{C2}$ is a mirror section where no recording is made as shown in FIG. 4.

As described above, in the optical disk according to this invention, a structure is arranged so that each of the clock pits formed on each track in the servo area for detecting the reproducing clock phase deviates from each other so as not to be affected by the cross talks from the adjacent tracks.

Now, the description will be made of an apparatus for reproducing the recorded information according to this invention, which performs the reproduction of the recorded information from the above-mentioned optical disk.

Figure 5:
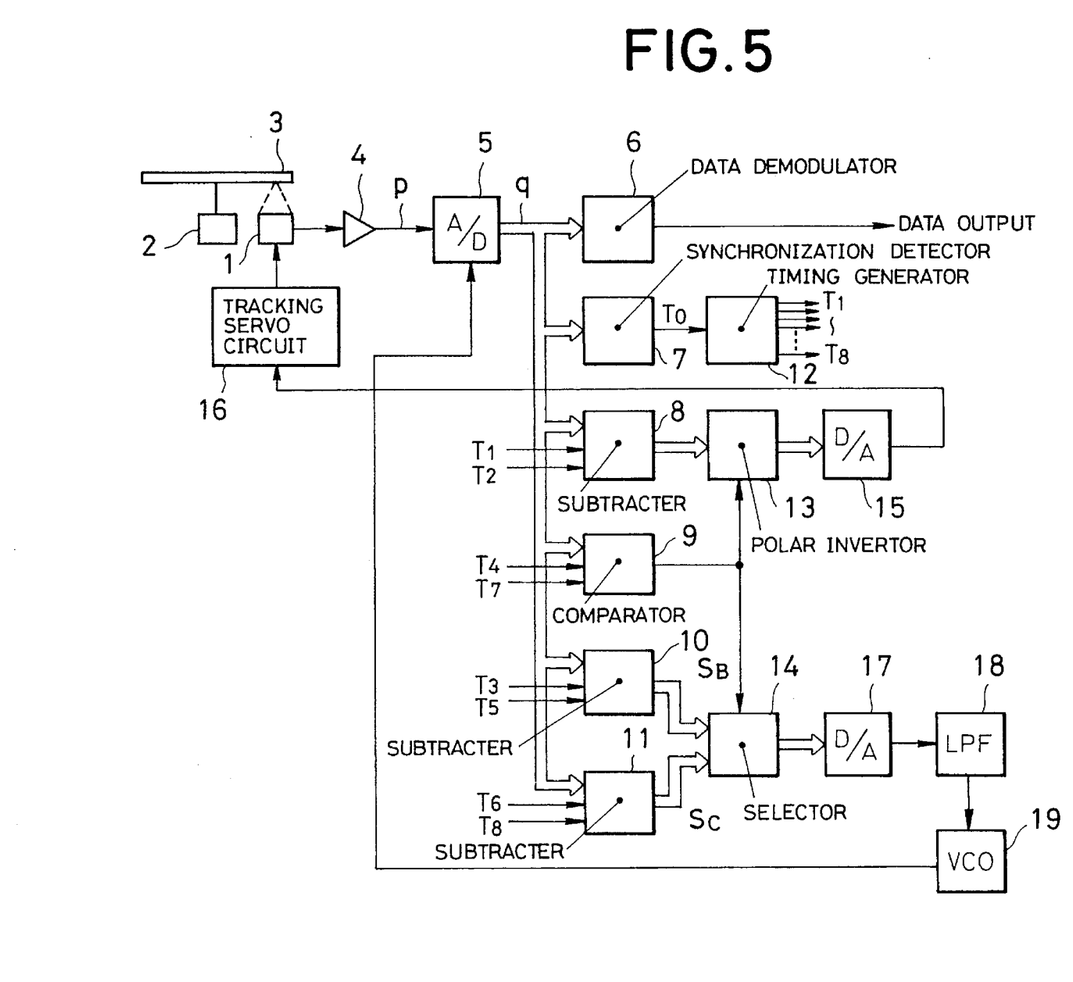
FIG. 5 is a view showing the structure of an apparatus for reproducing the recorded information according to this invention.

FIG. 5 is a view showing the structure of such apparatus for reproducing the recorded information.

In FIG. 5, a pick up 1 reads the recorded signals recorded on a disk 3 which is driven by a spindle motor 2 to rotate, and supplies a read-out signal to a head amplifier 4. The head amplifier 4 amplifies the read-out signal thus supplied as desired, and supplies it to an A/D converter 5 as a read-out signal p. The A/D converter 5 samples the read-out signal p by the timing of the reproducing clock, and converts them into the sample value serial q of the digital signal, hence supplying them to a data demodulator 6, synchronization detector 7, subtracter 8, comparator 9, subtracter 10, and subtracter 11, respectively. The data demodulator 6 demodulates the sample value serial q by a demodulation method corresponding to the one which is applied at the time of recording on the disk, and outputs them as the reproduced data.

The synchronization detector 7 observes the value of the sample value serial q, and generates a synchronization detection signal $T_0$ if the observing value is in a state at a given level over a given period of time, hence supplying it to the timing generator 12. In other words, the synchronization detector 7 generates the above-mentioned synchronization detection signal $T_0$ when it detects the read-out signal corresponding to the synchronous pit Ps shown in FIG. 4 among the signal read by the pick up 1 from the disk 3.

Figure 6:
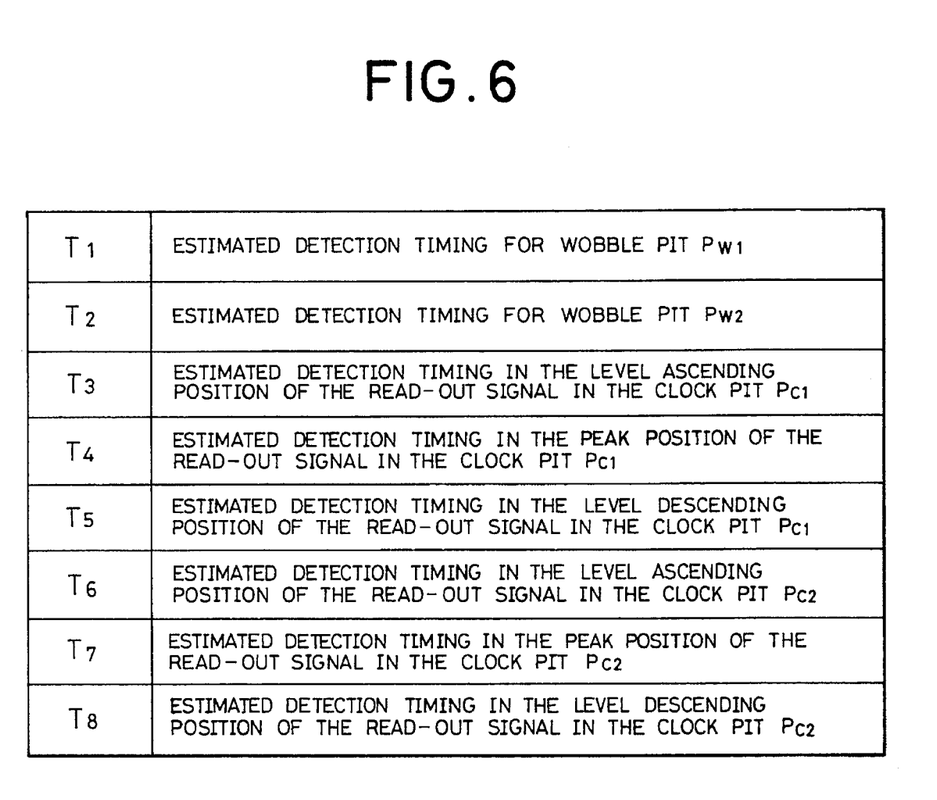
FIG. 6 is a view illustrating the timing signals generated by a timing generator 12.

The timing generator 12 generates the timing signals $T_1$ to $T_8$ which satisfy the timing conditions shown in FIG. 6 in accordance with the synchronization detection signal $T_0$. Of the timing signals $T_1$ to $T_8$, the timing signals $T_1$ and $T_2$ are supplied to the subtracter 8; timing signals $T_4$ and $T_7$, to the comparator 9; timing signals $T_3$ and $T_5$, to the subtracter 10, and timing signals $T_6$ and $T_8$, to the subtracter 11, respectively.

Figure 7:
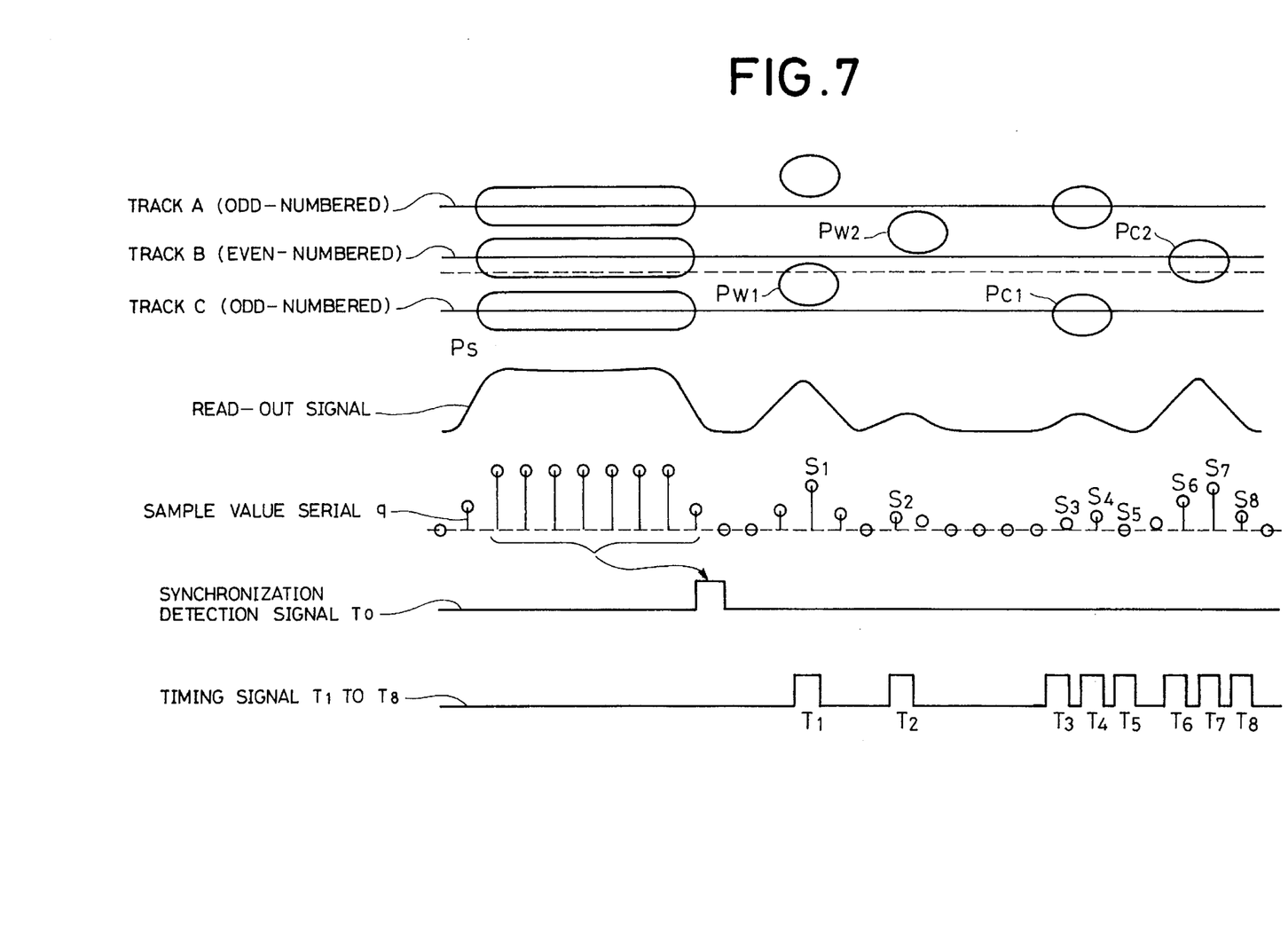
FIG. 7 is a view illustrating the inner operation of the apparatus for reproducing the recorded information according to this invention.

FIG. 7 is a view showing the read-out signal p, sample value serial q, synchronization detection signal $T_0$, and timing signals $T_1$ to $T_8$ obtainable when the servo area of an optical disk is being read as shown in FIG. 4. It should be noted that FIG. 7 shows an example of signal waveform obtainable when the pick up 1 traces in the vicinity of the track B, an even-numbered track of the tracks A to C, as indicated by broken line therein.

The subtracter 8 subtracts the sample value obtainable when the timing signal $T_1$ is supplied from the sample value obtainable when the timing signal $T_2$ is supplied among the sample value serial q, and it supplies the resultant difference to a polar invertor 13. In other words, the subtracter 8 detects the sample values $S_1$ and $S_2$ obtainable by the estimated detection timing of the read-out signal with respect to the wobble pits $P_{W1}$ and $P_{W2}$ among the sample value serial q as shown in FIG. 7, by use of the timing signals $T_1$ and $T_2$, respectively, and then, obtains the differential value of these sample values, (sample value $S_1$–sample value $S_2$), thus supplying it to the polar invertor 13.

The comparator 9 compares the sample value obtainable when the timing signal $T_4$ is supplied and the sample value obtainable when the timing signal $T_7$ is supplied among the sample value serial q, and generates a signal for identifying an odd or even number in accordance with the result of this comparison, thus supplying it to the polar invertor 13 and a selector 14, respectively. In other words, the comparator 9 detects the sample values $S_4$ and $S_7$ obtainable in accordance with the level peak points with respect to the clock pits $P_{C1}$ and $P_{C2}$ among the sample value serial q as shown in FIG. 7 by use of the sample timing signals $T_4$ and $T_7$, respectively, and identifies whether the pick up 1 currently traces an even-numbered track or an odd-numbered track by determining the greater value of these two sample values. In FIG. 7, the sample value $S_7$ is greater than the sample value $S_4$. Therefore, the pick up 1 currently traces in the vicinity of the track where the clock pit $P_{C2}$ is recorded rather than the track where the clock pit $P_{C1}$ is recorded. It is thus clear that the pick up 1 currently traces an even-numbered track. In this case, the comparator 9 generates a signal for identifying the odd or even number which currently indicates the logic value "1" representing the even-numbered track, and supplies it to the polar invertor 13 and the selector 14, respectively. In this respect, if the comparator 9 determines that the pick up 1 currently traces an odd-numbered track by the application of the above-mentioned identification, it generates a signal for identifying the odd or even number which currently indicates the logic value "0" representing the odd-numbered track, and supplies it to the polar invertor 13 and the selector 14, respectively.

The polar invertor 13 inverts the positive or negative polarity of the differential value supplied by the subtracter 8 in accordance with the logic value of the signal for identifying the odd or even number, and supplies it to a D/A converter 15. For example, the polar invertor 13 supplies the differential value supplied from the subtracter 8 to the D/A converter 15 as it is if the logic value of the signal for identifying the odd or even number is "0". On the other hand, it supplies the differential value supplied from the subtracter 8 to the D/A converter 15 after having inverted the positive or negative polarity thereof if the logic value of the signal for identifying the odd or even number is "1". In FIG. 7, the logic value of the signal for identifying the odd or even number is "1" as described above. Therefore, a value of —(sample value $S_1$–sample value $S_2$) which is obtained by inverting the positive or negative polarity of the differential value of (sample value $S_1$–sample value $S_2$) supplied from the subtracter 8 is supplied to the D/A converter 15.

The D/A converter 15 converts the digital value, that is, the above-mentioned differential value supplied from the polar invertor 13, into an analogue signal, and supplies it to the tracking servo circuit 16 as a tracking error signal.

The tracking servo circuit 16 generates a driving signal on the basis of the polarity and absolute value of the tracking error signal and causes the actuator in the pick up 1 to shift by the driving signal in the radial direction of the disk 3.

A tracking servo loop is formed by the above-mentioned subtracter 8, polar invertor 13, D/A converter 15, and tracking servo circuit 16. In the tracking servo loop, each of the read-out signal corresponding to the wobble pits $P_{W1}$ and $P_{W2}$ is detected from the signal read out from the disk 3, and the tracking control is made by the differential value of the read-out signal as the tracking error signal.

In this respect, as shown in FIG. 4, the positional relationship between the wobble pits $P_{W1}$ and $P_{W2}$ is inverted for the odd-numbered and even-numbered tracks. Consequently, the relationship between the direction in which the beam is displaced from the center of the track and the polarity of the differential value obtained from the subtracter 8 is inverted for the odd and even-numbered tracks. In the present embodiment, whether the track in the current reading is an odd-numbered track or an even-numbered track is determined by the comparator 9. Then the structure is arranged so that in accordance with the result of this determination, the polarity of the differential value obtained by the subtracter 8 is inverted. Therefore, it is possible to perform a normal tracking control even when the relationship between the direction in which the beam is displaced from the center of the track and the polarity of the differential value obtained by the subtracter 8 is inverted for the odd and even-numbered tracks as described above.

Now, the subtracter 10 subtracts the sample value obtainable when the timing signal $T_3$ is supplied from the sample value obtainable when the timing signal $T_5$ is supplied among the sample value serial q, and supplies the resultant difference to the selector 14 as a differential value $S_B$. In other words, the subtracter 10 detects the sample values $S_3$ and $S_5$ obtainable corresponding to the level ascending point and level descending point of the read-out signal with respect to the clock pit $P_{C1}$ among the sample value serial q as shown in FIG. 7 by use of the timing signals $T_3$ and $T_5$, respectively, and then, obtains the differential value of these sample values, (sample value $S_3$–sample value $S_5$), thus supplying it to the selector 14 as a differential value $S_B$. The differential value $S_B$ becomes the phase error signal of a reproducing clock to be generated in accordance with the clock pit $P_{C1}$.

The subtracter 11 subtracts the sample value obtainable when the timing signal $T_6$ is supplied from the sample value obtainable when the timing signal $T_8$ is supplied among the sample value serial q, and supplies the resultant difference to the selector 14 as a differential value $S_C$. In other words, the subtracter 11 detects the sample values $S_6$ and $S_8$ obtainable corresponding to the level ascending point and level descending point of the read-out signal with respect to the clock pit $P_{C2}$ among the sample value serial q as shown in FIG. 7 by use of the timing signals $T_6$ and $T_8$, respectively, and then, obtains the differential value of these sample values, (sample value $S_6$–sample value $S_8$), thus supplying it to the selector 14 as a differential value $S_C$. The differential value $S_C$ becomes the phase error signal of a reproducing clock to be generated in accordance with the clock pit $P_{C2}$.

The selector 14 selects either one of the differential values $S_B$ or the differential value $S_C$ in accordance with the logic value of the signal for identifying the odd or even number supplied from the above-mentioned comparator 9, and supplies it to the D/A converter 17 as a phase error signal of the reproducing clock. For example, the selector 14 supplies the differential value $S_B$ to the D/A converter 17 if the logic value of the signal for identifying the odd or even number is "0", that is, the value which represents an odd-numbered track, and on the other hand, supplies the differential value $S_C$ to the D/A converter 17 if the logic value of the signal for identifying the odd or even number is "1", that is, the value which represents an even-numbered track. In the embodiment shown in FIG. 7, the logic value of the signal for identifying the odd or even number is "1". Therefore, the differential value $S_C$=(sample value $S_6$–sample value $S_8$) is supplied to the D/A converter 17 as the phase error signal of the reproducing clock.

The D/A converter 17 converts the phase error signal supplied from the selector 14 in a digital value into an analog value, and supplies it to an LPF (low pass filter) 18. The LPF 18 averages the supplied analog values, and supplies it to a VCO (Voltage Control Oscillator) 19. The VCO 19 generates the reproducing clocks having the oscillated frequency corresponding to the averaged analog value supplied from the LPF 18, and supplies them to the A/D converter 5.

As described above, in an apparatus for reproducing recorded information, values of the read-out signal obtained by the respective estimated detection timing of the clock pits $P_{C1}$ and $P_{C2}$ are compared with each other by the comparator 9 at first, and the greater value of the two is determined. In accordance with the result of this comparison, whether the pick up currently traces an even-numbered track or an odd-numbered track is determined. At this time, the subtracter 10 generates the phase error signal (differential value $S_B$) on the basis of the value of the read-out signal obtained by the estimated detection timing of the clock pit $P_{C1}$. On the other hand, the subtracter 11 generates the phase error signal (differential value $S_C$) on the basis of the value of the read-out signal obtained by the estimated detection timing of the clock pit $P_{C2}$. Of such phase error signal, the selector 14 selects the phase error signal which is generated by the estimated timing of the clock pit corresponding to the result of the above-mentioned comparison, and makes it as the final phase error signal. In accordance with the phase error signal thus determined, the D/A converter 17, LPF 18 and VCO 19 correct the phase of the reproducing clock to be supplied to the A/D converter 5.

In other words, by use of a structure comprising the comparator 9, subtracter 10, subtracter 11, and selector 14, each value of the read-out signal obtained by the respective estimated timing of the clock pits $P_{C1}$ and $P_{C2}$ is compared, and then, means for,generating a phase error signal is formed to generate a phase error signal at this time on the basis of the read-out signal obtained at the time of the estimated detection timing corresponding to the maximum value.

Figure 8:
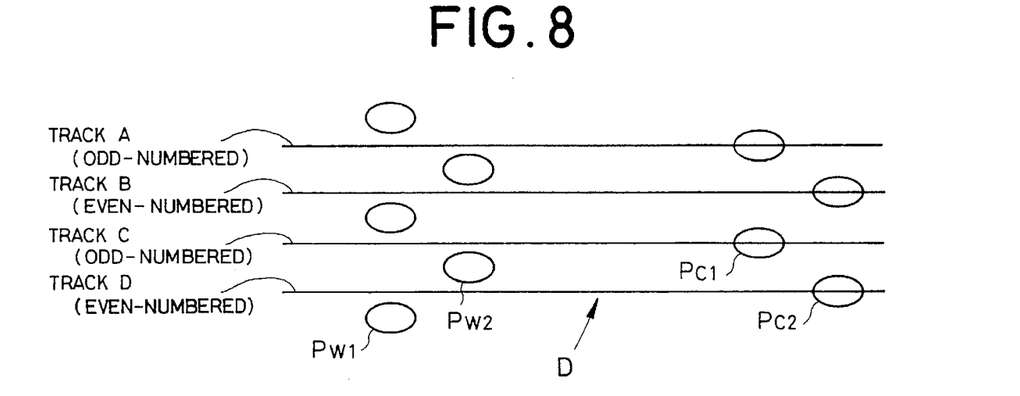
FIG. 8 is a view showing the structure of the servo area of an optical disk according to another embodiment of this invention.

It should be noted that in FIG. 4, a structure is arranged to provide in the servo area of an optical disk the synchronous pits $P_S$ having a pit length which does not appear in the data area, but this invention is not limited to such structure. For example, as shown in FIG. 8, there may be arranged a structure wherein the synchronous pits $P_S$ is replaced by a mirror section D having a given length which is provided between the wobble pits $P_{W1}$ and $P_{W2}$, and clock pits $P_{C1}$ and $P_{C2}$.

Figure 9:
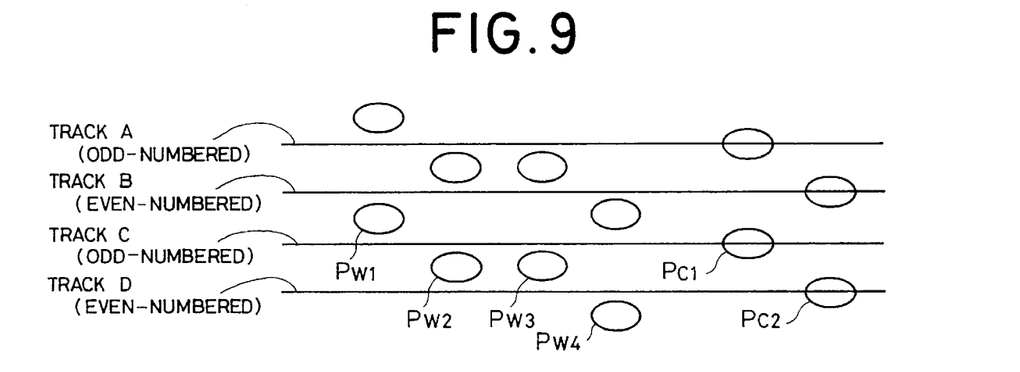
FIG. 9 is a view showing the structure of the servo area of an optical disk according to still another embodiment of this invention.
Figure 10:
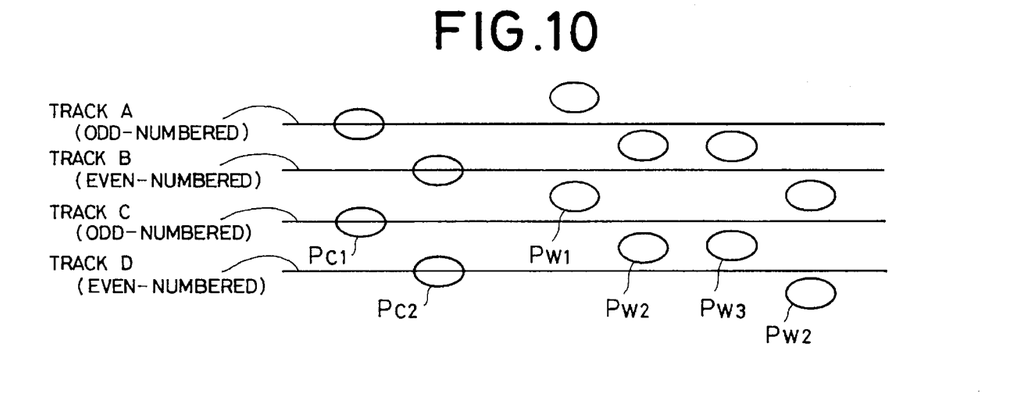
FIG. 10 is a view showing the structure of the servo area of an optical disk according to a further embodiment of this invention.
Figure 11:
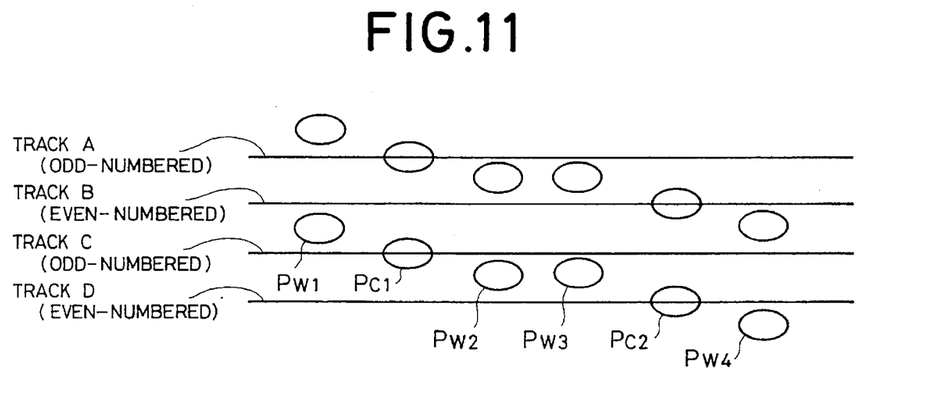
FIG. 11 is a view showing the structure of the servo area of an optical disk according to a still further embodiment of this invention.
Figure 12:
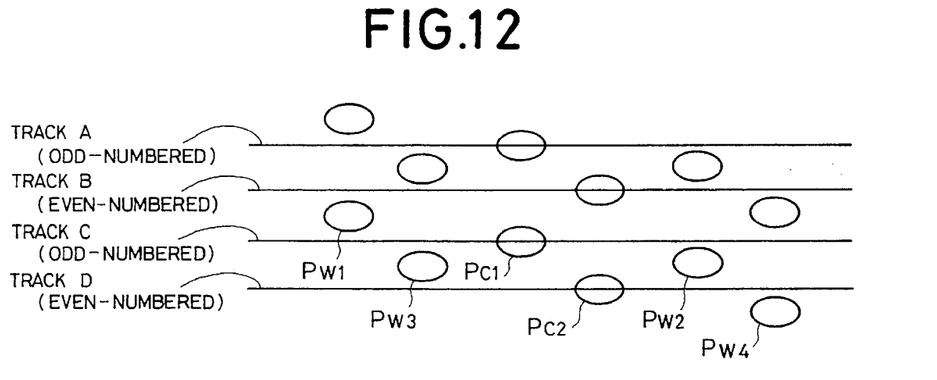
FIG. 12 is a view showing the structure of the servo area of an optical disk according to another embodiment of this invention.

Also, in FIG. 4, there is arranged a structure so that the wobble pits $P_{W1}$ and $P_{W2}$ for tracking servo deviate alternately per track, but as shown in FIG. 9 and FIG. 10, it may be possible to arrange the $P_{W1}$ and $P_{W2}$ as wobble pits for tracking servo on the odd-numbered track, and $P_{W3}$ and $P_{W4}$ as wobble pits for tracking servo on the even-numbered track, respectively. Here, in FIG. 10, a structural example is shown in which the positional relationship between the wobble pit group and clock pit group in FIG. 9 is inverted. Also, as shown in FIG. 11, it may be possible to arrange clock pits to be positioned between wobble pits. Further, as shown in FIG. 12, it may be possible to arrange a structure in which each of the pits is alternately arranged between adjacent tracks.

Figure 13:
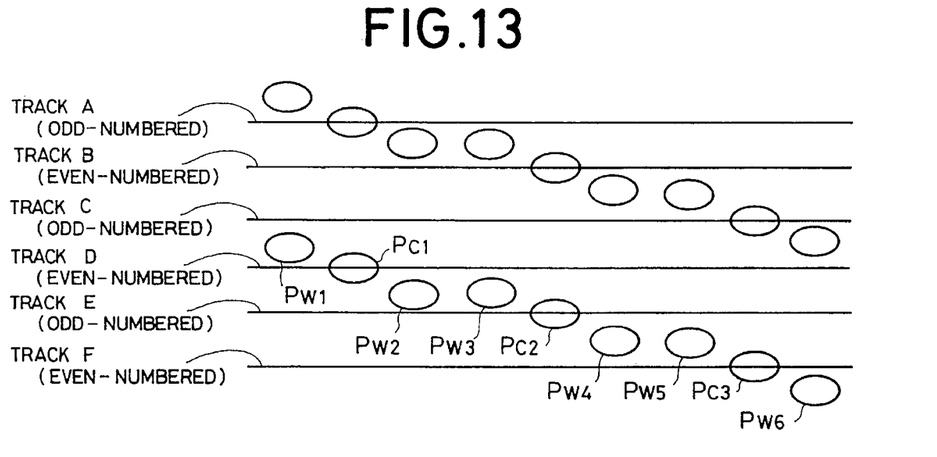
FIG. 13 is a view showing the structure of the servo area of an optical disk according to still another embodiment of this invention.

Also, in the above-mentioned embodiment, two kinds of clock pits $P_{C1}$ and $P_{C2}$ having different recording positions are arranged by distributing them to the odd-numbered and even-numbered tracks, respectively, but this invention is not limited to the two kinds of clock pits. For example, as shown in FIG. 13, it may be possible to arrange three kinds of clock pits $P_{C1}$, $P_{C2}$, and $P_{C3}$ having recording positions different from each other by allocating them to each of the tracks one after another.

As described above, in the optical disk according to this invention, a structure is arranged so that each of the clock pits in the servo area is provided to deviate from each other in the radial direction of the disk so as not to be affected by the cross talks from the adjacent tracks.

Also, in an apparatus for reproducing the recorded information which reproduces the recorded information on an optical disk according to this invention, a structure is arranged so that each value of the read-out signal obtained by the respective estimated detection timing of clock pits per track is compared, and then, a phase error signal is generated in accordance with the read-out signal obtained at the estimated detection timing corresponding to the result of such comparison, thus correcting the phase of the reproducing clock on the basis of such phase error signal.

As a result, according to this invention, there is no possibility that each of the clock pits is affected by the cross talks from the adjacent tracks when the clock pits are read even if each of the clock pits are displaced from its ideal recording position due to the rotational fluctuation of the rotational speed of a motor for an apparatus for recording a master disk. Consequently, no jitters are generated in the reproducing clock whose phase is to be corrected in accordance with the detection timing of such clock pits, hence making it possible to reproduce the information for the optical disk in a good precision.

What is claimed is:

1. An optical disk of a sampled servo type comprising:
   a plurality of tracks which are spaced from each other in a radial direction of the disk;
   a plurality of synchronization pits, each disposed on a corresponding one of said tracks in a servo area of the disk and aligned with each other in the radial direction of the disk; and
   a plurality of clock pits formed in said servo area on each of said tracks and arranged to deviate from each other in a reading direction of said disk per adjacent track.

2. The optical disk according to claim 1, wherein the tracks each include a mirror section where no recording is made, said mirror section of each of said tracks being in alignment in the radial direction of the disk with the clock pits on adjacent said tracks.

3. The optical disk according to claim 1, wherein the clock pits formed on even-numbered said tracks in said servo area are arranged apart from said synchronization pits on said respective tracks by a predetermined first distance, and the clock pits formed on odd-numbered said tracks in said servo area are arranged apart from said synchronization pits on said respective tracks by a predetermined second distance.

4. The optical disk as claimed in claim 1, further comprising a plurality of wobble pits in said servo area in areas between said tracks, said wobble pits deviating from each other in the reading direction of said disk per adjacent said areas between said tracks.

* * * * *